(12) United States Patent
Hu et al.

(10) Patent No.: US 11,995,059 B2
(45) Date of Patent: May 28, 2024

(54) DATABASE INDEX AND DATABASE QUERY PROCESSING METHOD, APPARATUS, AND DEVICE

(71) Applicant: Alibaba Group Holding Limited, Grand Cayman (KY)

(72) Inventors: Wei Hu, Hangzhou (CN); Jie Zhou, Hangzhou (CN); Dengcheng He, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 89 days.

(21) Appl. No.: 17/332,724

(22) Filed: May 27, 2021

(65) Prior Publication Data

US 2021/0286795 A1 Sep. 16, 2021

Related U.S. Application Data

(63) Continuation of application No. PCT/CN2019/119394, filed on Nov. 19, 2019.

(30) Foreign Application Priority Data

Nov. 27, 2018 (CN) .......................... 201811422523.X

(51) Int. Cl.
*G06F 16/22* (2019.01)
*G06F 16/9537* (2019.01)

(52) U.S. Cl.
CPC ...... *G06F 16/2246* (2019.01); *G06F 16/2282* (2019.01); *G06F 16/9537* (2019.01)

(58) Field of Classification Search
CPC ............ G06F 16/2246; G06F 16/2282; G06F 16/2453; G06F 16/387; G06F 16/587; G06F 16/909; G06F 16/9537
See application file for complete search history.

(56) References Cited

U.S. PATENT DOCUMENTS 7,725,425 B2 5/2010 Smartt
7,877,405 B2 1/2011 Kothuri et al.
(Continued)

FOREIGN PATENT DOCUMENTS

CN 107391502 A 11/2017
CN 108628969 A 10/2018
(Continued)

OTHER PUBLICATIONS

Translation of International Search Report dated Feb. 27, 2020, from corresponding PCT Application No. PCT/CN2019/119394, 2 pages.
(Continued)

*Primary Examiner* — James E Richardson
(74) *Attorney, Agent, or Firm* — Lee & Hayes P.C.

(57) ABSTRACT

A method including determining a database table for which a database index is to be created, wherein the database table comprises a spatial field for storing spatial data; acquiring, for the database table, a spatial filter condition comprising a spatial field ID; and generating, according to the spatial filter condition, a tree-structured spatial index for the database table, wherein a leaf node of the tree-structured spatial index stores therein spatial data meeting the spatial filter condition and its primary key ID. The efficiency of queries related to spatial data is thus enhanced.

20 Claims, 7 Drawing Sheets

(56) References Cited

U.S. PATENT DOCUMENTS

| | | | |
|---|---|---|---|
| 7,945,569 | B2 | 5/2011 | Drory et al. |
| 8,171,014 | B2 | 5/2012 | Adler et al. |
| 8,386,468 | B2 | 2/2013 | Hu et al. |
| 8,396,883 | B2 | 3/2013 | Liu et al. |
| 8,892,569 | B2 | 11/2014 | Bowman et al. |
| 10,007,677 | B1 | 6/2018 | Hines |
| 10,929,501 | B2 | 2/2021 | Kazmaier et al. |
| 2006/0129529 | A1 | 6/2006 | Adler |
| 2007/0168370 | A1 | 7/2007 | Hardy |
| 2007/0233720 | A1* | 10/2007 | Bae ................ G06F 16/2246 |
| 2009/0282122 | A1* | 11/2009 | Patel ................ H04W 4/02 709/207 |
| 2010/0114905 | A1* | 5/2010 | Slavik ................ G06F 16/29 707/743 |
| 2013/0262485 | A1 | 10/2013 | Li et al. |
| 2014/0244635 | A1* | 8/2014 | Hu ................ G06F 16/9537 707/724 |
| 2020/0394662 | A1 | 12/2020 | Lester et al. |

FOREIGN PATENT DOCUMENTS

| | | |
|---|---|---|
| EP | 1826691 A1 | 8/2007 |
| JP | 2007233658 A | 9/2007 |
| JP | 2010182097 A | 8/2010 |
| JP | 2013152531 A | 8/2013 |
| JP | 2015055914 A | 3/2015 |

OTHER PUBLICATIONS

Translation of Written Opinion dated Feb. 27, 2020, from corresponding PCT Application No. PCT/CN2019/119394, 3 pages.
Copy of the Extended European Search Report dated Jul. 20, 2022 for European Patent Application No. 19889311.7 10 pages.
Hongli Deng et al: "Retrieving large-scale high density video target tracks from spatial database", Computing for Geospatial Research and Applications, ACM, 2 Penn Plaza, Suite 701 New York NY 10121-0701 USA, Jul. 1, 2012 (Jul. 1, 2012), pp. 1-8, XP058008371, DOI: 10.1145/2345316.2345339 ISBN: 978-1-4503-1113-7.
Japanese Office Action mailed Jan. 9, 2024 for Japanese Application No. 2021-529833, a foreign counterpart to U.S. Appl. No. 17/332,724, 12 pages.

* cited by examiner

```
┌─────────────────────────────────────────────────┐
│  DETERMINE DATABASE TABLE WITHIN WHICH SPATIAL  │
│ DATA IS TO BE QUERIED, WHEREIN DATABASE TABLE   │
│   COMPRISES SPATIAL FIELD FOR STORING SPATIAL   │
│                      DATA                       │
│                      S302                       │
└─────────────────────────────────────────────────┘
                         │
                         ▼
┌─────────────────────────────────────────────────┐
│         ACQUIRE, FOR DATABASE TABLE, QUERY      │
│       CONDITION COMPRISING SPATIAL QUERY FIELD  │
│                      S304                       │
└─────────────────────────────────────────────────┘
                         │
                         ▼
┌─────────────────────────────────────────────────┐
│ ACQUIRE TREE-STRUCTURED SPATIAL INDEX OF        │
│ DATABASE TABLE, WHEREIN LEAF NODE OF            │
│ TREE-STRUCTURED SPATIAL INDEX STORES THEREIN    │
│ SPATIAL DATA                                    │
│                      S306                       │
└─────────────────────────────────────────────────┘
                         │
                         ▼
┌─────────────────────────────────────────────────┐
│       QUERY, ACCORDING TO QUERY CONDITION,      │
│          TREE-STRUCTURED SPATIAL INDEX          │
│             TO OBTAIN QUERY RESULT              │
│                      S308                       │
└─────────────────────────────────────────────────┘
```

FIG. 3

DATABASE INDEX AND DATABASE QUERY PROCESSING METHOD, APPARATUS, AND DEVICE

CROSS REFERENCE TO RELATED APPLICATIONS

This application claims priority to and is a continuation of PCT Patent Application No. PCT/CN2019/119394, filed on 19 Nov. 2019 and entitled "DATABASE INDEX AND DATABASE QUERY PROCESSING METHOD, APPARATUS, AND DEVICE," which claims priority to Chinese patent application No. 201811422523.X filed on 27 Nov. 2018 and entitled "DATABASE INDEX AND DATABASE QUERY PROCESSING METHOD, APPARATUS, AND DEVICE," which are incorporated herein by reference in their entirety.

TECHNICAL FIELD

The present disclosure relates to the field of data processing, and, more particularly, to methods, apparatuses, electronic devices, and storage devices for processing database indexes. The present disclosure also relates to a methods, apparatuses, electronic devices, and storage devices for processing database queries.

BACKGROUND

With the development of computer and information technology, spatial data and databases supporting spatial data storage and management have been widely used in various industries, such as urban planning, transportation, banking, and aerospace. The so-called spatial data, also known as geometric data, is a special type of data that can be processed by a computer to show information containing spatial coordinates. Examples of such data include spatial data representing architectural design drawings, mechanical design drawings, and maps. The spatial data may quantitatively describe objects and occurrences of things having positioning significance in the real world, such as identifying locations, shapes, sizes, and distribution characteristics of a spatial entity. The so-called spatial entity is a result of abstracting geographic objects and occurrences of things, and is also referred to as geographic entity or entity.

At present, a database that supports storing and managing spatial data generally provides spatial indexing for fast reading and integrity check of the spatial data stored therein. The so-called spatial indexing is a data structure arranged in a certain order according to positions and shapes of spatial objects or certain spatial relationships among the spatial objects. The existing spatial indexing only stores information that may cover minimum bounding rectangle (MBR) of the spatial objects. The so-called MBR refers to a minimum bounding rectangle that covers the spatial objects in two dimensions. When spatial data is queried, spatial data meeting a spatial filter condition is filtered and selected first; and then returning to a primary key table is needed for a further filtering to obtain a complete record. Therefore, when the number of records matching the spatial filter condition is relatively large during the query, CPU and TO overhead for returning to the primary key table to obtain the complete record is relatively large, resulting in a relatively low efficiency in spatial data queries.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a database index processing method and a database query processing method to improve the query efficiency of spatial data.

The present disclosure provides a database index processing method, comprising:

determining a database table for which a database index is to be created, wherein the database table comprises a spatial field for storing spatial data;

acquiring, for the database table, a spatial filter condition comprising a spatial field ID; and generating, according to the spatial filter condition, a tree-structured spatial index for the database table, wherein a leaf node of the tree-structured spatial index stores therein spatial data meeting the spatial filter condition and a primary key ID.

For example, the spatial filter condition comprises spatial field prefix information;

the generating, according to the spatial filter condition, the tree-structured spatial index for the database table comprises:

acquiring, according to the spatial filter condition, spatial field prefix information used for generating the tree-structured spatial index;

generating, according to the spatial field prefix information, a spatial prefix index for the database table, wherein an index column of the spatial prefix index comprises the spatial field prefix information; and using the spatial prefix index as the tree-structured spatial index.

For example, the spatial filter condition comprises a filter condition of a minimum bounding rectangle operation type;

the generating, according to the spatial field prefix information, the spatial prefix index of the database table comprises:

performing, according to the filter condition of the minimum bounding rectangle operation type, minimum bounding box filtering on the database table to obtain an alternative spatial field meeting the filter condition of the minimum bounding rectangle operation type;

performing standard byte-stream encoding for geospatial information on spatial data stored in the alternative spatial field; and generating the spatial prefix index of the database table according to the spatial data on which the standard byte-stream encoding for geospatial information is performed and the spatial field prefix information.

For example, the spatial field prefix information comprises a condition for indicating a length of spatial data stored in the spatial field;

the generating the spatial prefix index of the database table according to the spatial data on which the standard byte-stream encoding for geospatial information is performed and the spatial field prefix information comprises:

acquiring a length of the spatial data on which the standard byte-stream encoding for geospatial information is performed;

acquiring the length condition according to the spatial field prefix information; and if the length of the spatial data on which the standard byte-stream encoding for geospatial information is performed meets the length condition, storing in a leaf node of the spatial prefix index the spatial data meeting the length condition;

otherwise, the leaf node of the spatial prefix index does not save the spatial data.

For example, the generating, according to the spatial filter condition, the tree-structured spatial index for the database table comprises:

acquiring, according to the spatial filter condition, information of a spatial field used for generating the tree-structured spatial index;

acquiring information of a non-spatial field used for generating the tree-structured spatial index;

generating, according to the information of the spatial field and the information of the non-spatial field, a composite spatial index of the database table, wherein an index column of the spatial composite index comprises the spatial field and the non-spatial field; and using the composite spatial index as the tree-structured spatial index.

For example, the generating, according to the spatial filter condition, the tree-structured spatial index for the database table comprises:

acquiring, according to the spatial filter condition, information of a spatial field prefix used for generating the tree-structured spatial index;

acquiring information of a non-spatial field used for generating the tree-structured spatial index;

generating, according to the information of the spatial field prefix and the information of the non-spatial field, a composite prefix spatial index, wherein an index column of the composite prefix spatial index comprises the spatial field prefix and the non-spatial field; and using the spatial composite prefix index as the tree-structured spatial index.

For example, an index column of the tree-structured spatial index comprises a spatial field; and a non-leaf node of the tree-structured spatial index stores therein a minimum bounding rectangle for retrieving the spatial data and a page ID for searching a next-level page.

For example, the method further comprises:

creating, according to a database table creation command, the database table, wherein the database table creation command comprises an index creation command for generating the tree-structured spatial index; or creating, according to the index creation command, the tree-structured spatial index.

The present disclosure further provides a database query processing method, comprising:

determining a database table within which spatial data is to be queried, wherein the database table comprises a spatial field for storing spatial data;

acquiring, for the database table, a query condition comprising a spatial query field;

acquiring a tree-structured spatial index of the database table, wherein a leaf node of the tree-structured spatial index stores therein spatial data; and querying, according to the query condition, the tree-structured spatial index to obtain a query result.

For example, the query condition further comprises a non-spatial field;

the querying, according to the query condition, the tree-structured spatial index to obtain the query result comprises:

acquiring a spatial field of the query condition;

determining whether the spatial field matches a spatial field ID of an index column of the tree-structured spatial index;

if so, querying, according to the spatial query field of the query condition, a composite spatial index of the database table to obtain a query result meeting the query condition; and if not, obtaining an alternative record of a non-spatial query field matching the query condition in the database table; and acquiring, according to the spatial query field of the query condition and from the alternative record, a query result meeting the query condition.

For example, the querying, according to the spatial query field of the query condition, the composite spatial index of the database table to obtain the query result meeting the query condition comprises:

acquiring a non-spatial query field of the query condition;

determining whether the spatial query field and the non-spatial query field are index columns comprised in the composite spatial index of the database table;

if so, determining that the query condition meets a spatial index query mode of the database table, and querying, according to the query condition, the composite spatial index of the database table using a covering index scan; and if not, querying to find, according to the query condition, an alternative record meeting the query condition from the composite spatial index of the database table, and according to a primary key of the alternative record, returning to the database table for further querying and obtaining a complete row record that meets the query condition.

For example, the querying, according to the query condition, the composite spatial index of the database table using the covering index scan comprises:

determining, according to the spatial query field, whether the spatial query field is a spatial field of the composite spatial index of the database table that is queried;

if so, querying the composite spatial index using the covering index scan according to a length condition included in prefix information of the spatial query field; and if not, querying the composite spatial index of the database table using the covering index scan.

For example, the querying the composite spatial index using the covering index scan according to the length condition included in prefix information of the spatial query field comprises:

acquiring the length condition included in the prefix information of the spatial query field;

determining whether a length of a row record of the composite spatial index meets the length condition; and if so, using the row record as a query result of the covering index scan; and if not, querying the database table according to primary key information.

For example, the acquiring, according to the spatial query field of the query condition and from the alternative record, the query result meeting the query condition comprises:

performing spatial computation on data of the alternative row record, and according to a computation result, acquiring, from the alternative row record, a row record that accords with the spatial query field; and using the row record that meets the spatial query field as the query result meeting the query condition.

For example, spatial query information of the query condition is a minimum bounding rectangle operation comprising the spatial query field.

For example, an index column of the tree-structured spatial index comprises a spatial field; and a non-leaf node of the tree-structured spatial index stores therein a minimum bounding rectangle for retrieving the spatial data and a page ID for searching a next-level page.

The present disclosure further provides a database index processing apparatus, comprising:

a database table determination unit, configured to determine a database table for which a database index is to be created, wherein the database table comprises a spatial field for storing spatial data;

a filter condition acquisition unit, configured to acquire, for the database table, a spatial filter condition comprising a spatial field ID; and an index generation unit, configured to generate, according to the spatial filter condition, a tree-structured spatial index for the database table, wherein a leaf node of the tree-structured spatial index stores therein spatial data meeting the spatial filter condition and a primary key ID.

The present disclosure further provides a database query processing apparatus, comprising:

a database table determination unit, configured to determine a database table within which spatial data is to be queried, wherein the database table comprises a spatial field for storing spatial data;

a query condition determination unit, configured to acquire, for the database table, a query condition comprising a spatial query field;

an index acquisition unit, configured to acquire a tree-structured spatial index of the database table, wherein a leaf node of the tree-structured spatial index stores therein the spatial data; and a query unit, configured to query, according to the query condition, the tree-structured spatial index to obtain a query result.

The present disclosure further provides an electronic device, comprising:

a memory and a processor;

the memory is configured to store computer-executable instructions, and the processor is configured to execute the computer-executable instructions to perform acts comprising:

determining a database table for which a database index is to be created, wherein the database table comprises a spatial field for storing spatial data;

acquiring, for the database table, a spatial filter condition comprising a spatial field ID; and generating, according to the spatial filter condition, a tree-structured spatial index for the database table, wherein a leaf node of the tree-structured spatial index stores therein spatial data meeting the spatial filter condition and a primary key ID.

The present disclosure further provides an electronic device, comprising:

a memory and a processor;

the memory is configured to store computer-executable instructions, and the processor is configured to execute the computer-executable instructions to perform acts comprising:

determining a database table within which spatial data is to be queried, wherein the database table comprises a spatial field for storing spatial data;

acquiring, for the database table, a query condition comprising a spatial query field;

acquiring a tree-structured spatial index of the database table, wherein a leaf node of the tree-structured spatial index stores therein spatial data; and querying, according to the query condition, the tree-structured spatial index to obtain a query result.

The present disclosure further provides a storage device having instructions stored therein, and the instructions can be loaded by a processor to execute the following acts:

determining a database table for which a database index is to be created, wherein the database table comprises a spatial field for storing spatial data;

acquiring, for the database table, a spatial filter condition comprising a spatial field ID; and generating, according to the spatial filter condition, a tree-structured spatial index for the database table, wherein a leaf node of the tree-structured spatial index stores therein spatial data meeting the spatial filter condition and a primary key ID.

The present disclosure further provides a storage device having instructions stored therein, and the instructions can be loaded by a processor to execute the following acts:

determining a database table within which spatial data is to be queried, wherein the database table comprises a spatial field for storing spatial data;

acquiring, for the database table, a query condition comprising a spatial query field;

acquiring a tree-structured spatial index of the database table, wherein a leaf node of the tree-structured spatial index stores therein spatial data; and querying, according to the query condition, the tree-structured spatial index to obtain a query result.

Compared with the conventional techniques, the present disclosure has the following advantages:

the database index processing method provided by the present disclosure generates, according to a spatial filter condition of a database table including a spatial filed, a tree-structured spatial index for the database table, and stores spatial data meeting the spatial filter condition in a leaf node of the tree-structured spatial index. Storing spatial data in an index improves the query efficiency of the spatial data, thereby solving the problem of low efficiency in querying spatial data. Further, when the tree-structured spatial index is a composite spatial index including a non-spatial field, a filtering of a non-spatial column may further be provided, thereby reducing the number of table access by index rowid operations, and improving the query efficiency.

According to a query condition containing a spatial query field, the database query processing method provided by the present disclosure queries a tree-structured spatial index of the database table to obtain a query result. As a leaf node of the tree-structured spatial index stores spatial data, the overhead for querying spatial data is reduced, thereby solving the problem of low efficiency in querying spatial data. Further, when the tree-structured spatial index is a composite spatial index including a non-spatial field, a filtering of a non-spatial column may further be provided, thereby reducing the number of table access by index rowid operations, and improving the query efficiency.

BRIEF DESCRIPTION OF DRAWINGS

The accompanying drawings described herein are intended to provide a further understanding of the present disclosure, and constitute a part of the present disclosure. The illustrative embodiments of the present disclosure and the descriptions thereof are used to explain the present disclosure and are in no way intended to limit the present disclosure. In the drawings:

FIG. 3 is a processing flowchart of a database query processing method according to an embodiment of the present disclosure;

DESCRIPTION OF EMBODIMENTS

In the following description, many specific details are explained in order for those skilled in the art to fully understand the present disclosure. However, the present disclosure can be implemented in many other manners different from those described herein. Those skilled in the art may make similar generalization without departing from the spirit of the present disclosure. Therefore, the present disclosure is not limited by the specific implementations disclosed below.

The present disclosure provides methods, apparatuses, electronic devices, and storage devices for processing database indexes. The present disclosure also relates to methods, apparatuses, electronic devices, and storage devices for processing database queries. Detailed description is provided in each of the following embodiments.

An embodiment of the present disclosure provides a database index processing method.

The database index processing method provided by the embodiment of the present disclosure will be described below in combination with FIG. 1 and FIG. 2.

Figure 1:
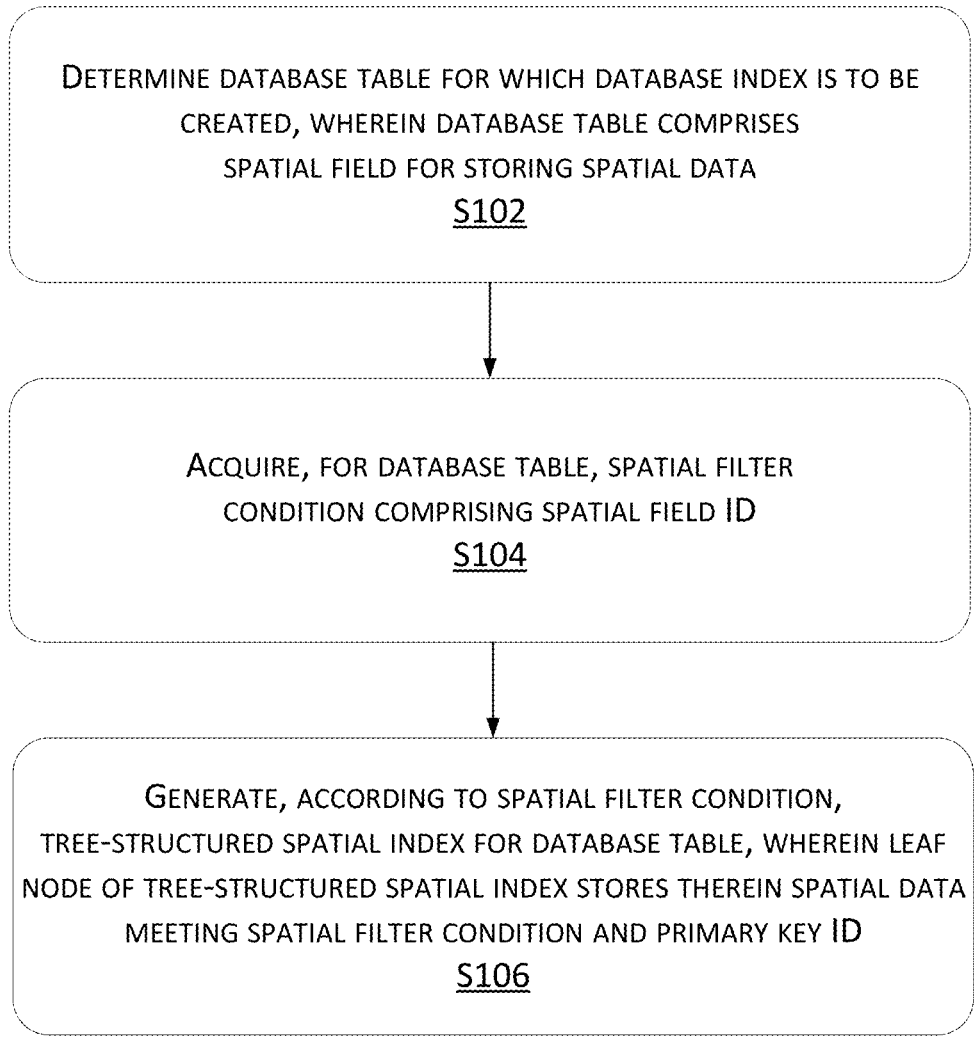
FIG. 1 is a processing flowchart of a database index processing method according to an embodiment of the present disclosure.
Figure 2:
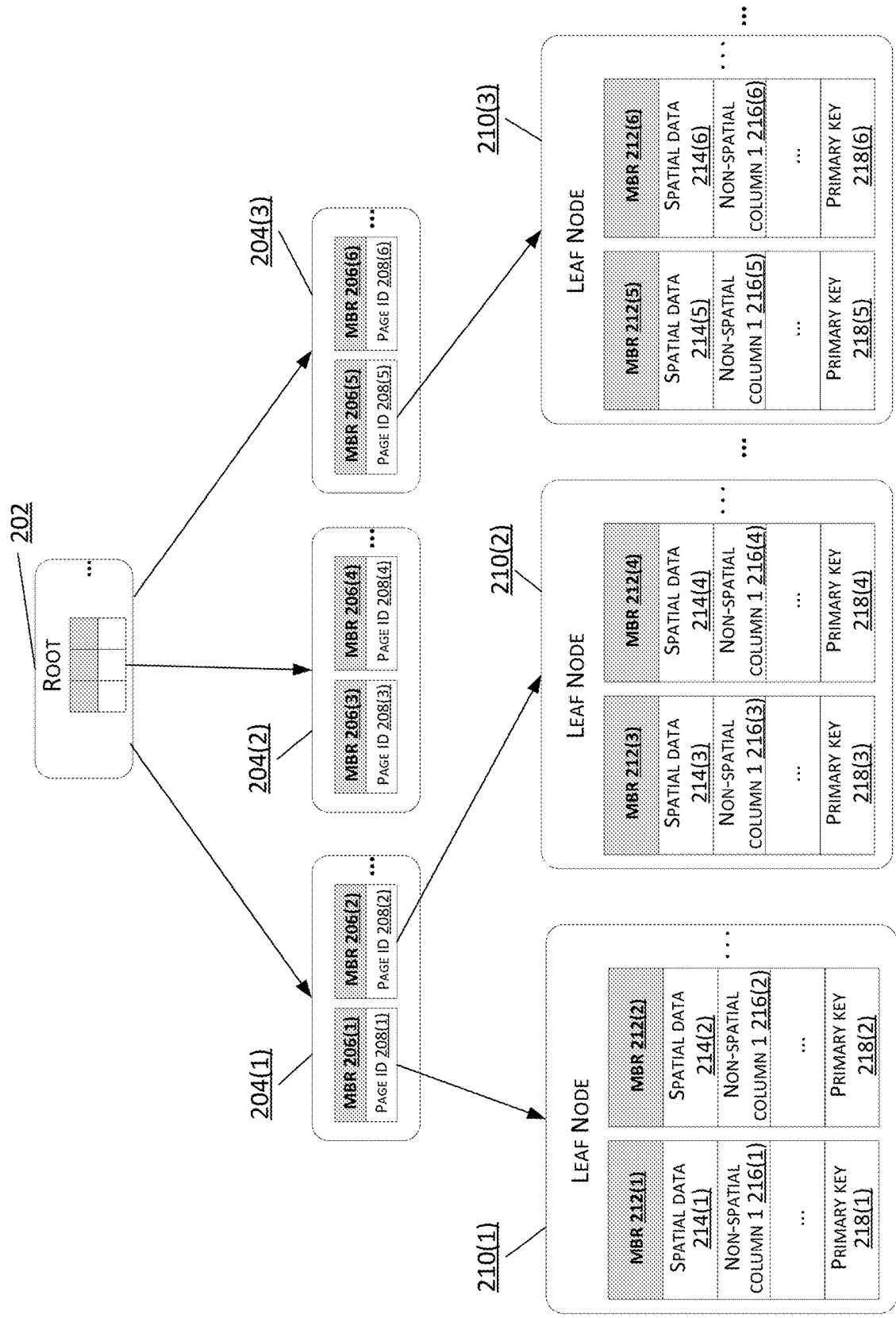
FIG. 2 is a schematic structural diagram of a database index according to an embodiment of the present disclosure.

The database index processing method shown in FIG. 1 includes: steps S102 to S106.

Step S102. Determine a database table for which a database index is to be created, wherein the database table comprises a spatial field for storing spatial data.

In practical applications, a database that supports spatial data generally provides spatial indexing. As traditional spatial indexing only stores MBR information and/or minimum bounding box (MBB) information, a further table access by index rowid operation is needed. The so-called MBB and MBR refer to a minimum bounding range that encompasses a spatial object. The minimum bounding range that encompasses a spatial object in two-dimensions is a minimum bounding rectangle (MBR), and the minimum bounding range that encompasses a spatial object in three-dimensions is a minimum bounding box (MBB). The table access by index rowid operation means that, after an alternative record meeting a spatial filter condition of filter conditions is queried and selected, the process returns to a primary key table for a further query to obtain all fields, and to determine whether other non-spatial filter conditions in the filter conditions are met. Taking a database of a clustered index table as an example. The table access by index rowid operation for the clustered index table is inefficient and slow, which results in inefficient query of spatial data. The so-called clustered index table is a commonly used form for organizing a database table, which means that all records in the database table are organized in accordance with a primary key order. Indexing is used for storing data in a database table, and data is indexed using the primary key of the database table. A database index generated based on a clustered index table is a secondary index of the database table. The secondary index refers to a non-primary key index. In addition, when the number of records matching the spatial filter condition is relatively large during the query, CPU and IO overhead for the table access by index rowid operation to obtain the complete record is relatively large, resulting in a relatively low efficiency in spatial data queries. It should be noted that the database index processing method provided by the present disclosure may also be used for heap tables.

In the database index processing method proposed by the present disclosure, a leaf node of a tree-structured spatial index of the obtained database table stores spatial data that meets the spatial filter condition, and a query meeting a certain condition directly obtains a query result from the tree-structured spatial index of the database table. Not all queries need the table access by index rowid operation to obtain complete records, which makes transactions containing querying of spatial data faster and more efficient for spatial filtering queries.

This step is to determine a database table for which a database index is to be created, the database table containing a spatial field. The example here uses a database table test of a database A (test is the table name). The table test uses a GEOM field to store Geo-Information system (GIS) spatial data. The GIS spatial data falls into the Geometry data type. GEOM is a field ID (or called field name) of the table test. Geometry is a type of spatial data supported by a database, which maybe longitudinal and latitudinal information representing a geographic location. The table test further includes other non-spatial fields, i.e., ordinary fields, such as ID int, NAME varchar (500), PRICE double, VERSION int, Primary key (id), and others, respectively corresponding to an ID (identification) of an integer type, a NAME (name) of a character type with a length of 500, a PRICE (price) of a double precision type, and the ID being used as a primary key. As such, a record of the table test includes the identification, name, price, and location information of an object. The GEOM field is a spatial field, whereas other fields storing non-spatial data are ordinary fields or non-spatial fields.

Step S104. Acquire, for the database table, a spatial filter condition comprising a spatial field ID.

This step is to determine the spatial filter condition for generating a spatial index, also known as a filter condition.

In an implementation manner provided by the embodiment of the present disclosure, the spatial filter condition includes a spatial field, and an index column of a tree-structured spatial index obtained in a corresponding subsequent step includes the spatial field.

In another implementation manner provided by the embodiment of the present disclosure, the spatial filter condition includes a spatial field prefix. Spatial data may be alternatively stored in a tree-structured index generated subsequently using the spatial field prefix. In other words, a constraint condition of the spatial data stored in the index may be defined or specified through the spatial field prefix. Specifically, the constraint condition is determined according to the actual situation of the spatial data of the spatial field in a database table record and by taking into account the balance between query efficiency and space occupation. For example, when the space occupation is still available, the condition for storing the spatial data in the index is loosened so as to store in the index as much spatial data as possible, which improves the query efficiency.

Further, the spatial filter condition further includes at least one of the following: a non-spatial field and a non-spatial field prefix. The spatial indexes generated according to different spatial filter conditions in the subsequent steps include different field types. If the spatial filter condition refers to a spatial field prefix, the obtained spatial index is a spatial prefix index, and an index column of the spatial prefix index includes the spatial field prefix. If the spatial filter condition refers to a spatial field prefix and a non-spatial field, a spatial field prefix and a non-spatial field prefix, a spatial field prefix, a non-spatial field, or a non-spatial field prefix, then the spatial index obtained subsequently is a composite prefix spatial index. An index column of the composite prefix spatial index includes the spatial field prefix, and further includes at least one of the following: a non-spatial field and a non-spatial field prefix.

In an embodiment of the present disclosure, index-creation instruction information may be obtained at the stage when a database table is created, or it may be obtained after the database table is created or after the database table has been created and data has been inserted. The process specifically includes:

creating, according to a database table creation command, the database table, wherein the database table creation command comprises an index creation command for generating the tree-structured spatial index; or creating, according to the index creation command, the tree-structured spatial index.

Still use the database table test of the database A as an example. Creating test with the following command is to obtain the index-creation instruction information for creating a spatial index sck:

Create table test (
ID int,
NAME varchar(500),
PRICE double,
GEOM. Geometry,
VERSION int,
Primary key(id),
Spatial key sck (geom(30), version)
);

The above-mentioned index-creation instruction information of the spatial index sck included in the creation command for table test includes a 30-byte prefix of the spatial field GEOM, a VERSION field, and a primary key ID automatically included as a secondary index. It may also be created by using "create index" after the table test is created or after data is inserted into the table test. For example, the index-creation instruction information of the spatial index sck1 includes a 30-byte prefix of the spatial field GEOM, a PRICE field, and a primary key ID automatically included as a secondary index. The command is as follows: create spatial key sck1(geom(20), price).

Step S106. Generate, according to the spatial filter condition, a tree-structured spatial index for the database table, wherein a leaf node of the tree-structured spatial index stores therein spatial data meeting the spatial filter condition and a primary key ID.

This step is to generate a tree-structured spatial index storing the spatial data.

In an embodiment of the present disclosure, when the spatial filter condition includes a spatial field and a non-spatial field, the tree-structured spatial index for the database table is generated specifically through the following processing:

acquiring, according to the spatial filter condition, information of a spatial field used for generating the tree-structured spatial index;

acquiring information of a non-spatial field used for generating the tree-structured spatial index;

generating, according to the information of the spatial field and the information of the non-spatial field, a composite spatial index of the database table, wherein an index column of the spatial composite index comprises the spatial field and the non-spatial field; and using the composite spatial index as the tree-structured spatial index.

In an embodiment of the present disclosure, when the spatial filter condition includes information of a spatial field prefix and information of a non-spatial field, the tree-structured spatial index for the database table is generated specifically through the following processing:

acquiring, according to the spatial filter condition, information of a spatial field prefix used for generating the tree-structured spatial index;

acquiring information of a non-spatial field used for generating the tree-structured spatial index;

generating, according to the information of the spatial field prefix and the information of the non-spatial field, a composite prefix spatial index, wherein an index column of the composite prefix spatial index comprises the spatial field prefix and the non-spatial field; and using the spatial composite prefix index as the tree-structured spatial index.

In an implementation manner provided by the embodiment of the present disclosure, an index column of the generated tree-structured spatial index includes a spatial field; and a non-leaf node of the tree-structured spatial index stores therein a minimum bounding rectangle for retrieving the spatial data and a page ID for searching a next-level page.

In another specific implementation manner provided by the embodiment of the present disclosure, an index column of the generated tree-structured spatial index includes spatial field prefix information; and a non-leaf node of the tree-structured spatial index stores therein a minimum bounding rectangle for retrieving the spatial data and a page ID for searching a next-level page. The tree-structured spatial index for the database table is generated specifically through the following processing:

acquiring, according to the spatial filter condition, spatial field prefix information used for generating the tree-structured spatial index;

generating, according to the spatial field prefix information, a spatial prefix index for the database table, wherein an index column of the spatial prefix index comprises the spatial field prefix information; and using the spatial prefix index as the tree-structured spatial index.

Further, the spatial filter condition includes a filter condition for a minimum bounding rectangle operation type. Accordingly, the processing of generating the spatial prefix index of the database table according to the spatial field prefix information includes the following:

performing, according to the filter condition of the minimum bounding rectangle operation type, minimum bounding box filtering on the database table to obtain an alternative spatial field meeting the filter condition of the minimum bounding rectangle operation type;

performing standard byte-stream encoding for geospatial information on spatial data stored in the alternative spatial field; and generating the spatial prefix index of the database table according to the spatial data on which the standard byte-stream encoding for geospatial information is performed and the spatial field prefix information.

The so-called geospatial information standard byte stream refers to the Well-known Binary (WKB), which uses a continuous binary stream to express geometric information.

In an implementation manner provided by the embodiment of the present disclosure, the spatial field prefix information includes a condition for indicating a length of the spatial data stored in the spatial field. Accordingly, the generating the spatial prefix index of the database table according to the spatial data on which the standard byte-stream encoding for geospatial information is performed and the spatial field prefix information specifically includes:

acquiring a length of the spatial data on which the standard byte-stream encoding for geospatial information is performed;

acquiring the length condition according to the spatial field prefix information; and if the length of the spatial data on which the standard byte-stream encoding for geospatial information is performed meets the length condition, storing in a leaf node of the spatial prefix index the spatial data meeting the length condition;

otherwise, the leaf node of the spatial prefix index does not save the spatial data.

Still using the database table test of the database A as an example. A tree-structured composite prefix spatial index is generated based on GEOM, VERSION, and NAME. The structure of the index is shown in FIG. 2. FIG. 2 shows a schematic structural diagram of the tree-structured composite prefix spatial index. The structure of the composite prefix spatial index is a structure of an R-tree index. In the figure, 202 indicates that Root is a root node of the R-tree, which stores a maximum rectangular space. The non-leaf node indicated by 204 stores a minimum bounding rectangle (MBR) for spatial retrieval and a pageid (page identification) for searching a next page. For example, the non-leaf node 204 (1) stores MBR 206(1) and pageid 208(1), MBR 206(2) and pageid 208(2). The non-leaf node 204(2) stores MBR 206(3) and pageid 208(3), MBR 206(4) and pageid 208(4). The non-leaf node 204(3) stores MBR 206(5) and pageid 208(5), MBR 206(6) and pageid 208(6).

Content stored in the leaf node indicated by 210 is different from that stored in the non-leaf node indicated by 204. The content stored in the leaf node indicated by 210 includes not only the MBR, but also spatial data of a constraint condition included in the spatial field prefix, and it may further include a conventional non-spatial field, such as Col1 included in 210 of the figure. In this example, the content specifically includes a VERSION field and a NAME field, as well as a primary key PK automatically included in the composite prefix spatial index as a secondary index, such as PK included in 210 of the figure. In this example, since the primary key of the table test is ID, the leaf node of the specific composite prefix spatial index also includes an ID field.

For example, the leaf node 210(1) stores MBR 212(1), spatial data 214(1), non-spatial column 1 216(1), and primary key 218(1). The leaf node 210(1) also stores MBR 212(2), spatial data 214(2), non-spatial column 1 216(2), and primary key 218(1). The leaf node 210(2) stores MBR 212(3), spatial data 214(3), non-spatial column 1 216(3), and primary key 218(1). The leaf node 210(2) also stores MBR 212(4), spatial data 214(4), non-spatial column 1 216(4), and primary key 218(4). The leaf node 210(3) stores MBR 212(5), spatial data 214(5), non-spatial column 1 216(5), and primary key 218(5). The leaf node 210(3) also stores MBR 212(6), spatial data 214(6), non-spatial column 1 216(6), and primary key 218(6).

Based on the above-described embodiment, an embodiment of the present disclosure further provides a database query processing method.

Please refer to FIG. 3, which shows a database query processing method provided by the embodiment of the present disclosure. As this embodiment is based on the embodiment, the description therefor is relatively concise. For related parts, reference may be made to the corresponding description of the embodiment.

The database query processing method provided by the embodiment of the present disclosure includes steps S302 to S308.

Step S302. Determine a database table within which spatial data is to be queried, wherein the database table comprises a spatial field for storing spatial data.

This step is to determine a database table within which spatial data is to be queried.

In this embodiment of the present disclosure, the database table is determined by acquiring a query command. The database table test of the database A is still used as an example. An example of the query command is as follows:

select ID, GEOM, VERSION from test where MBRIntersects(GEOM, ST_GeomFromText('POLYGON ((113.22779059410095 23.077155641028952, 113.22927117347716 23. 077155641028952, 113.22927117347716 23.078517734365768, 113.22779059410095 23.07 8517734365768, 113.22779059410095 23.077155641028952))',4326)) and version in (2, 3);

a record of the table test includes an identification, name, price, and location information of an object, and the table test uses a spatial field GEOM to store GIS spatial data including longitudinal and latitudinal information. The table test further includes other non-spatial fields: ID int, NAME varchar (500), PRICE double, VERSION int, Primary key (id), and other fields, respectively corresponding to an ID (identification) of an integer type, a NAME (name) of a character type with a length of 500, a PRICE (price) of a double precision type, and the primary key being specified as the ID field. The above query command is to select, from the table test, recorded ID, GEOM, and VERSION information meeting a query condition that is specified by the where clause. The query condition in this example includes a spatial query condition and a non-spatial query condition.

Step S304. Acquire, for the database table, a query condition comprising a spatial query field.

This step is to determine a query condition comprising a spatial query field.

In an embodiment of the present disclosure, spatial query information of the query condition includes a spatial query field, and the spatial query information is specifically a minimum bounding rectangle operation including the spatial query field.

Still using the query command of the database table test of the database A as an example.

MBRIntersects(GEOM, ST_GeomFromText('POLYGON ((113.22779059410095 23. 077155641028952, 113.22927117347716 23.077155641028952, 113.22927117347716 23.07 8517734365768, 113.22779059410095 23.078517734365768, 113.22779059410095 23.0771 55641028952))',4326))

in the where clause of the above-mentioned command is to determine whether the minimum bounding rectangle operation is one involving intersecting or overlapping.

In an embodiment of the present disclosure, the query condition further includes at least one of the following: a non-spatial field and a non-spatial field prefix.

Step S306. Acquire a tree-structured spatial index of the database table, wherein a leaf node of the tree-structured spatial index stores therein spatial data.

This step is to acquire a tree-structured spatial index.

In an embodiment of the present disclosure, the step specifically includes the following processing: acquiring a query condition for the database table, determining that the query condition includes a spatial query field, and obtaining a spatial index or a composite spatial index established for the database table. Specifically, an index column of the tree-structured spatial index comprises a spatial field; and a non-leaf node of the tree-structured spatial index stores therein a minimum bounding rectangle for retrieving the spatial data and a page ID for searching a next-level page. For example, the leaf node further includes a primary key ID.

Still using the database table test of the database A as an example. A tree-structured composite prefix spatial index generated based on GEOM, VERSION, and NAME is obtained for the table test. The structure of the index is shown in FIG. 2. FIG. 2 shows a schematic structural diagram of the tree-structured composite prefix spatial index. The structure of the composite prefix spatial index is a structure of an R-tree index. In the figure, 202 indicates that Root is a root node of the R-tree, which stores a maximum rectangular space. The non-leaf node indicated by 204 only stores a minimum bounding rectangle (MBR) for spatial retrieval and a pageid (page identification) for searching a next page. Content stored in the leaf node indicated by 210 is different from that stored in the non-leaf node indicated by 204. The content stored in the leaf node indicated by 210 includes not only the MBR, but also spatial data of a constraint condition included in the spatial field prefix, and it certainly further includes a conventional non-spatial field, such as a VERSION field, a NAME field, and a primary key PK automatically included in the composite prefix spatial index as a secondary index. Since the primary key of the table test is ID, the leaf node of the specific composite prefix spatial index also includes an ID field.

Step S308. Query, according to the query condition, the tree-structured spatial index to obtain a query result.

This step is to query, according to the query condition, the tree-structured spatial index.

In an embodiment of the present disclosure, the query condition further includes a non-spatial field, and the query result is obtained specifically through the following processing:

acquiring a spatial field of the query condition;

determining whether the spatial field matches a spatial field ID of an index column of the tree-structured spatial index;

if so, querying, according to the spatial query field of the query condition, a composite spatial index of the database table to obtain a query result meeting the query condition; and if not, obtaining an alternative record of a non-spatial query field matching the query condition in the database table; and acquiring, according to the spatial query field of the query condition and from the alternative record, a query result meeting the query condition. In an embodiment of the present disclosure, the acquiring, from the alternative record, a query result meeting the query condition specifically includes the following processing:

performing spatial computation on data of the alternative row record, and according to a computation result, acquiring, from the alternative row record, a row record that accords with the spatial query field; and using the row record that meets the spatial query field as the query result meeting the query condition.

In an embodiment of the present disclosure, if it is determined that the spatial field matches the spatial field ID of the index column of the tree-structured spatial index, then the querying, according to the spatial query field of the query condition, the composite spatial index of the database table to obtain the query result meeting the query condition is done through the following processing:

acquiring a non-spatial query field of the query condition;

determining whether the spatial query field and the non-spatial query field are index columns comprised in the composite spatial index of the database table;

if so, determining that the query condition meets a spatial index query mode of the database table, and querying, according to the query condition, the composite spatial index of the database table using a covering index scan;

if not, querying to find, according to the query condition, an alternative record meeting the query condition from the composite spatial index of the database table, and according to a primary key of the alternative record, returning to the database table for further querying and obtaining a complete row record that meets the query condition.

Specifically, the querying, according to the query condition, the composite spatial index of the database table using the covering index scan is done through the following processing:

determining, according to the spatial query field, whether the spatial query field is a spatial field of the composite spatial index of the database table that is queried;

if so, querying the composite spatial index using the covering index scan according to a length condition included in prefix information of the spatial query field; and if not, querying the composite spatial index of the database table using the covering index scan.

In an embodiment of the present disclosure, specifically, the querying the composite spatial index using the covering index scan according to the length condition included in prefix information of the spatial query field is done through the following processing:

acquiring the length condition included in the prefix information of the spatial query field;

determining whether a length of a row record of the composite spatial index meets the length condition; and if so, using the row record as a query result of the covering index scan; and if not, querying the database table according to primary key information.

Figure 4:
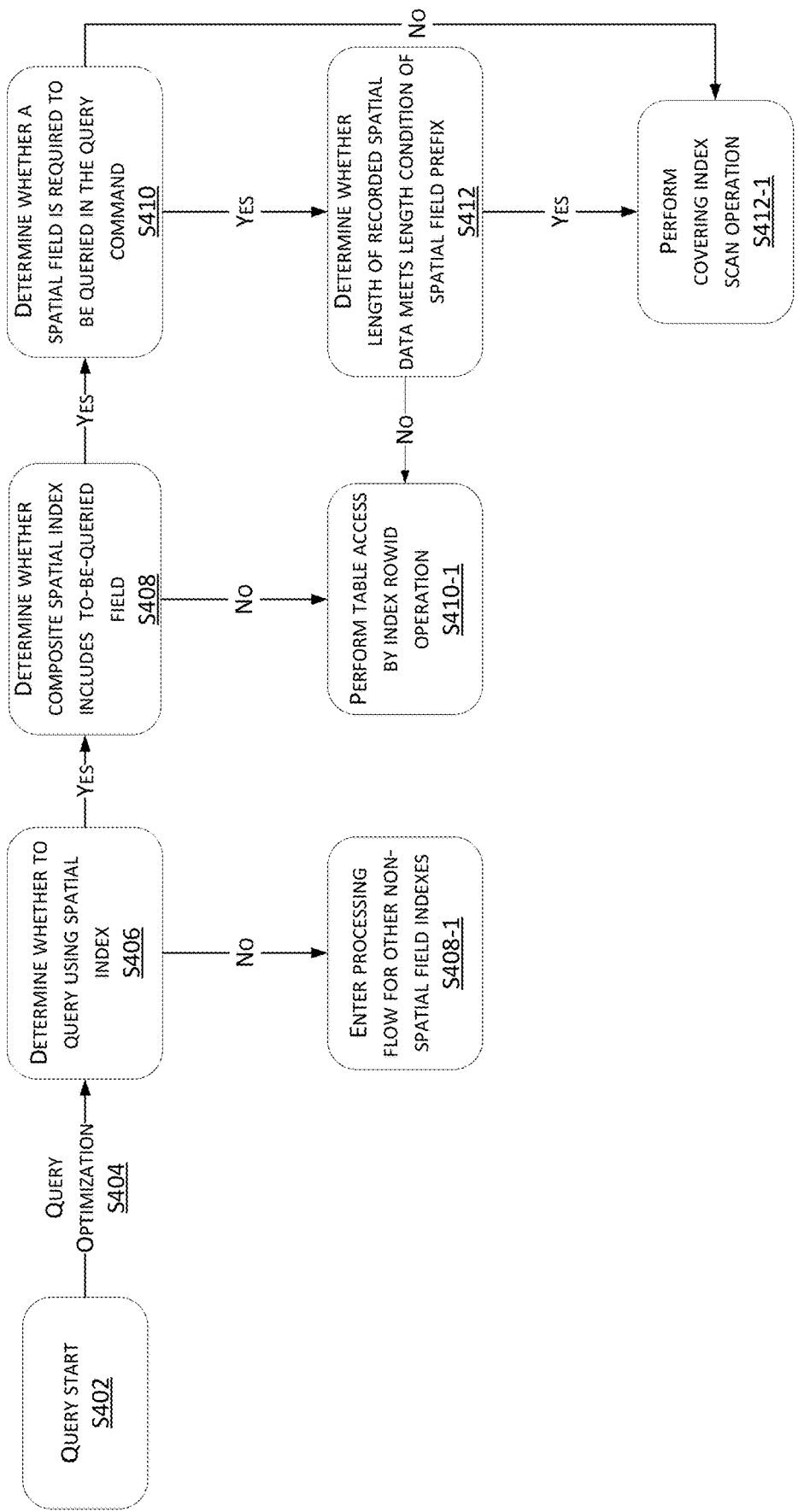
FIG. 4 is a flowchart of actual implementation of a database query according to an embodiment of the present disclosure.

Please refer to FIG. 4, which shows a flowchart of a specific implementation of the database query processing method provided by the embodiment of the present disclosure. In the figure, the implementation comprises the following steps:

S402. Query start; that is, a query command is received, and a query process is started.

S404. Query optimization; that is, a statement of the query command is parsed, and a query condition is split into various tokens to be used for subsequent steps.

S406. Determine whether to query using a spatial index. In an embodiment of the present disclosure, if the query condition includes geometric operators for spatial data, such as intersection, containing, orientation, distance between, distance sorting, etc., then the spatial index will be determined to be used preferentially; if so, proceed to S408; if not, proceed to S408-1.

S408. Determine whether a composite spatial index includes a to-be-queried field; that is, whether the composite spatial index includes a field required to be queried in the query command is determined. In an embodiment of the present disclosure, it is determined whether a composite spatial index of the database table includes a field (or a column of the database table) required to be queried in the query command according to each token obtained through splitting. If the composite spatial index includes the field required to be queried in the query command, proceed to S410; and if the composite spatial index does not include the field required to be queried in the query command, proceed to S410-1.

S408-1. Enter a processing flow for other non-spatial field indexes. That is, the spatial index query cannot be preferentially performed, and the query needs to be based on a non-spatial field. In an embodiment of the present disclosure, the following operations are performed: obtaining an alternative record of a non-spatial query field matching the query condition in the database table; and acquiring, according to the spatial query field of the query condition and from the alternative record, a query result meeting the query condition. Specifically, the following processing is included:

performing spatial computation on data of the alternative row record, and according to a computation result, acquiring, from the alternative row record, a row record that accords with the spatial query field; and using the row record that meets the spatial query field as the query result meeting the query condition.

In this processing, it is necessary to query complete data recorded in each row, and then standard spatial functions are used to compute and decide whether the query condition is met in which geometric spatial operations such as intersection, containing, orientation, distance between, distance sorting, etc. may be performed.

S410. Determine whether a spatial field is required to be queried in the query command. If the spatial field is required to be acquired in the query command, proceed to S412; and if the spatial field is not required to be obtained in the query command, then proceed to S412-1.

S410-1. Perform a table access by index rowid operation, which specifically means that, after an alternative record meeting a spatial query condition of a query condition is queried and selected, the process returns to a primary key table for a further query to obtain all fields, and to determine whether other non-spatial query conditions in the query condition are met.

S412. Determine whether a length of recorded spatial data meets a length condition of a spatial field prefix. If the length of the spatial data meets the length condition of the spatial field prefix, then proceed to S412-1; and if the length of the spatial data does not meet the length condition of the spatial field prefix, then proceed to S410-1.

S412-1. Perform a covering index scan operation; that is, perform a covering index scan on the composite spatial index to obtain a required query result.

Still use the query command of the database table test of the database A as an example. The above select command is to select, from the table test, recorded ID, GEOM, and VERSION information meeting a query condition that is specified by the where clause. The query condition in this example includes a spatial query condition and a non-spatial query condition. The spatial query condition is an MBRIntersects operation, and the non-spatial query condition is a VERSION condition, namely version in (2, 3). A composite prefix spatial index sck is created when the table test is created. The sck records a 30-byte prefix of the GEOM field, VERSION, and a primary key ID automatically included as a secondary index. In the where condition of the query, there is first a filter condition of a minimum bounding rectangle operation, which meets the query filtering of the spatial index; and then other filter conditions and queried content are index columns of this sck index. As a result, S410 is executed. In addition, whether a spatial index query mode may be used is determined. Whether the spatial field of the composite spatial index has been filtered by a condition that the spatial index can perform is further determined, such as a bounding rectangle operation, a distance operation, etc., and whether the composite spatial index further includes filtering of other ordinary fields. During the execution of S410, since the geom field is selected, the process continues to S412 to further determine the length condition of the spatial prefix. If the geom in the result meeting bounding rectangle filtering in the index is less than 30 bytes after encoded using wkb, for example, point(113.228, 23.078), which correspondingly has a wkb length of 25, then complete geom wkb information may be recorded in a leaf node of the sck index. In this case, the process continues to S412-1 for the covering index scan. If it is a very large multi polygon and the wkb encoding length exceeds 30 bytes, the record of this situation is marked on the sck index, and the table access by index rowid operation is performed according to the mark, which means that the process continues to S410-1 and check the primary key index again to obtain a complete record of geom.

In accordance with the database index processing method provided by the embodiment of the present disclosure, an embodiment of the present disclosure further provides a database index processing apparatus.

Figure 5:
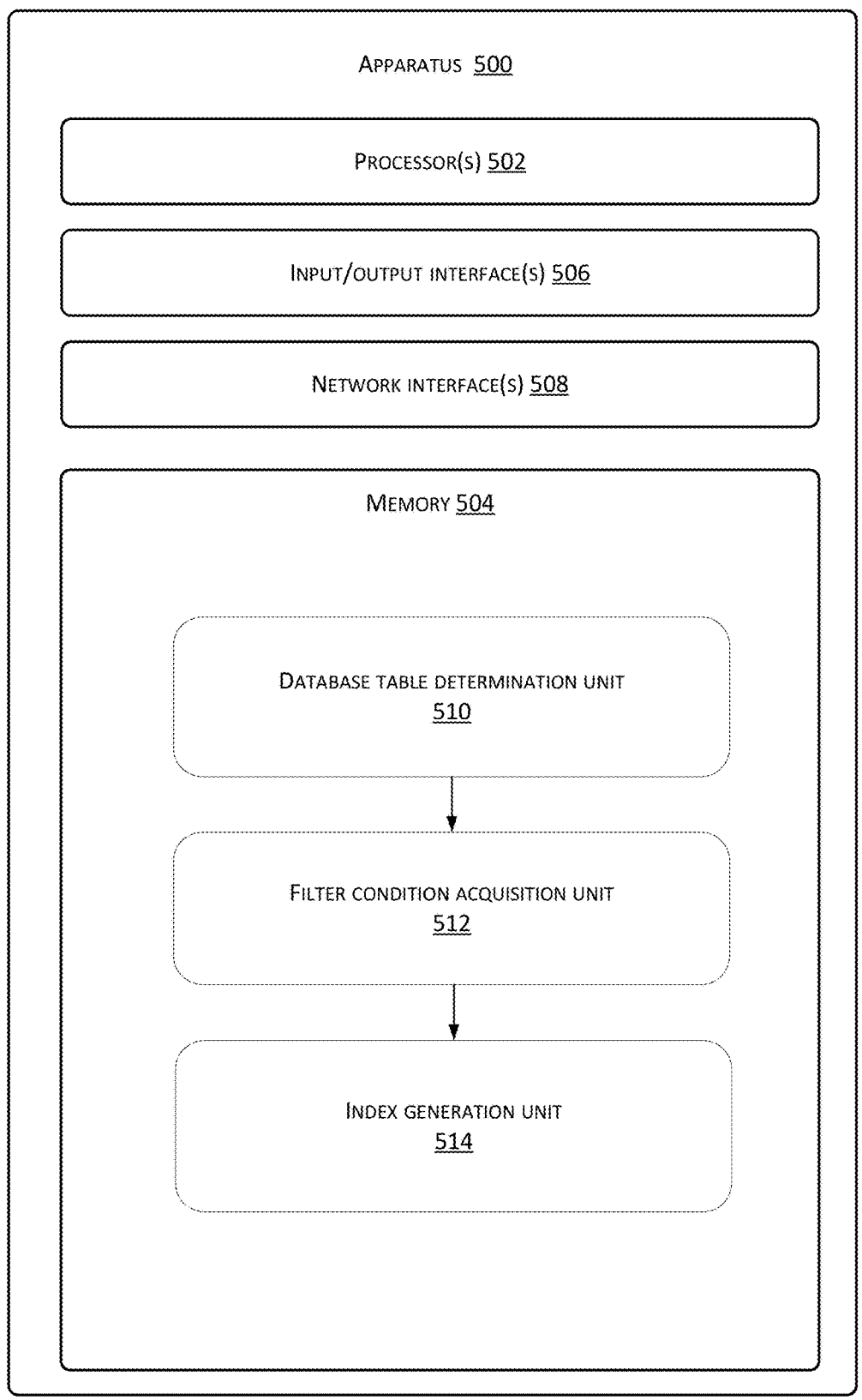
FIG. 5 is a schematic diagram of a database index processing apparatus according to an embodiment of the present disclosure.

Please refer to FIG. 5, which shows a schematic diagram of a database index processing apparatus 500 provided according to the embodiment of the present disclosure. Since the apparatus embodiment is basically similar to the method embodiment, the description is relatively concise. For related parts, reference may be made to the corresponding description of the method embodiment.

As shown in FIG. 5, the apparatus 500 includes one or more processor(s) 502 or data processing unit(s) and memory 504. The apparatus 500 may further include one or more input/output interface(s) 506 and one or more network interface(s) 508.

The memory 504 is an example of the computer-readable media.

The memory 104 may store therein a plurality of modules or units including:

a database table determination unit 510, configured to determine a database table for which a database index is to be created, wherein the database table comprises a spatial field for storing spatial data;

a filter condition acquisition unit 512, configured to acquire, for the database table, a spatial filter condition comprising a spatial field ID; and an index generation unit 514, configured to generate, according to the spatial filter condition, a tree-structured spatial index for the database table, wherein a leaf node of the tree-structured spatial index stores therein spatial data meeting the spatial filter condition and a primary key ID.

Herein, the spatial filter condition includes spatial field prefix information; and the index generation unit 514 is specifically configured to:

acquire, according to the spatial filter condition, spatial field prefix information used for generating the tree-structured spatial index;

generate, according to the spatial field prefix information, a spatial prefix index for the database table, wherein an index column of the spatial prefix index comprises the spatial field prefix information; and use the spatial prefix index as the tree-structured spatial index.

Herein, the spatial filter condition includes a filter condition of a minimum bounding rectangle operation type; and the index generation unit 514 is specifically configured to:

perform, according to the filter condition of the minimum bounding rectangle operation type, minimum bounding box filtering on the database table to obtain an alternative spatial field meeting the filter condition of the minimum bounding rectangle operation type;

perform a standard byte-stream encoding for geospatial information on spatial data stored in the alternative spatial field; and generate the spatial prefix index of the database table according to the spatial data on which the standard byte-stream encoding for geospatial information is performed and the spatial field prefix information.

Herein, the spatial field prefix information includes a condition for indicating a length of the spatial data stored in the spatial field; and the index generation unit 514 is specifically configured to:

acquire a length of the spatial data on which the standard byte-stream encoding for geospatial information is performed;

acquire the length condition according to the spatial field prefix information; and if the length of the spatial data on which the standard byte-stream encoding for geospatial information is performed meets the length condition, store in a leaf node of the spatial prefix index the spatial data meeting the length condition;

otherwise, the leaf node of the spatial prefix index does not save the spatial data.

Herein, the index generation unit 514 is specifically configured to:

acquire, according to the spatial filter condition, information of a spatial field used for generating the tree-structured spatial index;

acquire information of a non-spatial field used for generating the tree-structured spatial index;

generate, according to the information of the spatial field and the information of the non-spatial field, a composite spatial index of the database table, wherein an index column of the spatial composite index comprises the spatial field and the non-spatial field; and use the composite spatial index as the tree-structured spatial index.

Herein, the index generation unit 514 is specifically configured to:

acquire, according to the spatial filter condition, information of a spatial field prefix used for generating the tree-structured spatial index;

acquire information of a non-spatial field used for generating the tree-structured spatial index;

generate, according to the information of the spatial field prefix and the information of the non-spatial field, a composite prefix spatial index, wherein an index column of the composite prefix spatial index comprises the spatial field prefix and the non-spatial field; and use the composite prefix spatial index as the tree-structured spatial index.

An index column of the tree-structured spatial index comprises a spatial field; and a non-leaf node of the tree-structured spatial index stores therein a minimum bounding rectangle for retrieving the spatial data and a page ID for searching a next-level page.

Herein, the apparatus further includes a command unit, and the command unit is configured to:

create, according to a database table creation command, the database table, wherein the database table creation command comprises an index creation command for generating the tree-structured spatial index; or create, according to the index creation command, the tree-structured spatial index.

In accordance with the database query processing method provided by the embodiment of the present disclosure, an embodiment of the present disclosure further provides a database query processing apparatus.

Figure 6:
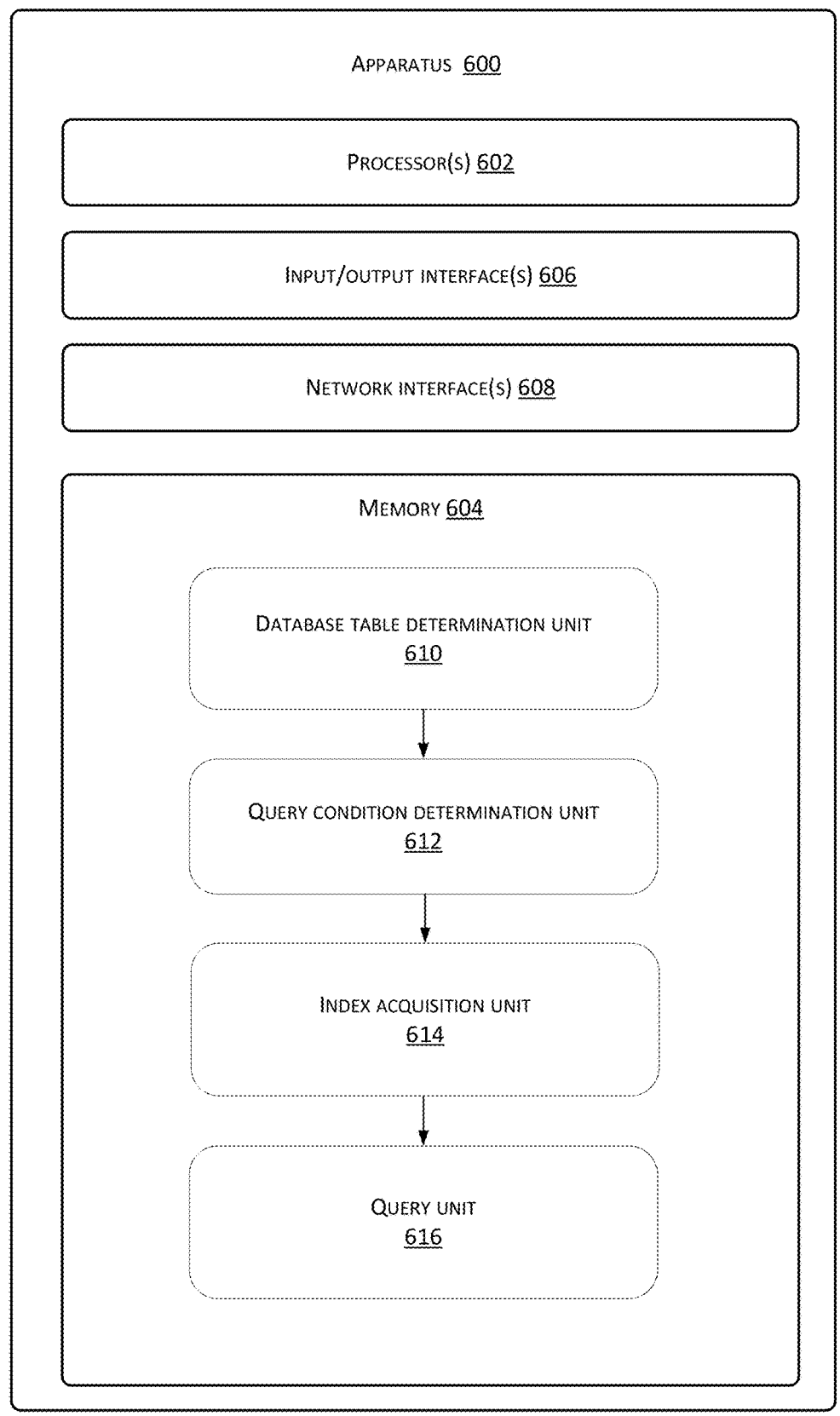
FIG. 6 is a schematic diagram of a database query processing apparatus according to an embodiment of the present disclosure.

Please refer to FIG. 6, which shows a schematic diagram of a database query processing apparatus 600 provided according to the embodiment of the present disclosure. Since the apparatus embodiment is basically similar to the method embodiment, the description is relatively concise. For related parts, reference may be made to the corresponding description of the method embodiment.

As shown in FIG. 6, the apparatus 600 includes one or more processor(s) 602 or data processing unit(s) and memory 604. The apparatus 600 may further include one or more input/output interface(s) 606 and one or more network interface(s) 608.

The memory 604 is an example of the computer-readable media.

The memory 604 may store therein a plurality of modules or units including:

a database table determination unit 610, configured to determine a database table within which spatial data is to be queried, wherein the database table comprises a spatial field for storing spatial data;

a query condition determination unit 612, configured to acquire, for the database table, a query condition comprising a spatial query field;

an index acquisition unit 614, configured to acquire a tree-structured spatial index of the database table, wherein a leaf node of the tree-structured spatial index stores therein the spatial data; and a query unit 616, configured to query, according to the query condition, the tree-structured spatial index to obtain a query result.

The query condition further includes a non-spatial field; and the query unit 616 is specifically configured to:

acquire a spatial field of the query condition;

determine whether the spatial field matches a spatial field ID of an index column of the tree-structured spatial index;

if so, query, according to the spatial query field of the query condition, a composite spatial index of the database table to obtain a query result meeting the query condition; and if not, obtain an alternative record of a non-spatial query field matching the query condition in the database table; and acquire, according to the spatial query field of the query condition and from the alternative record, a query result meeting the query condition.

Herein, the query unit 616 is specifically configured to: acquire a non-spatial query field of the query condition;

determine whether the spatial query field and the non-spatial query field are index columns comprised in the composite spatial index of the database table;

if so, determine that the query condition meets a spatial index query mode of the database table, and query, according to the query condition, the composite spatial index of the database table using a covering index scan;

if not, query to find, according to the query condition, an alternative record meeting the query condition from the composite spatial index of the database table, and according to a primary key of the alternative record, return to the database table for further querying and obtaining a complete row record that meets the query condition.

Herein, the query unit 616 includes a covering index scan subunit, and the covering index scan subunit is configured to: determine, according to the spatial query field, whether a spatial field of the composite spatial index of the database table is queried;

if so, query the composite spatial index using the covering index scan according to a length condition included in prefix information of the spatial query field; and if not, query the composite spatial index of the database table using the covering index scan.

Herein, the covering index scan subunit is specifically configured to: acquire the length condition included in the prefix information of the spatial query field;

determine whether a length of a row record of the composite spatial index meets the length condition; and if so, use the row record as a query result of the covering index scan; and if not, query the database table according to primary key information.

Herein, the query unit 616 is specifically configured to: perform spatial calculation on data of the alternative row record, and according to a calculation result, acquire, from the alternative row record, a row record that meets the spatial query field; and use the row record that meets the spatial query field as the query result meeting the query condition.

Herein, spatial query information of the query condition is a minimum bounding rectangle operation comprising the spatial query field.

An index column of the tree-structured spatial index comprises a spatial field; and a non-leaf node of the tree-structured spatial index stores therein a minimum bounding rectangle for retrieving the spatial data and a page ID for searching a next-level page.

Herein, the leaf node further includes a primary key ID.

Based on the foregoing embodiments, an embodiment of the present disclosure further provides an electronic device for implementing the database index processing method. Please refer to FIG. 7, which shows a schematic diagram of the electronic device provided by the embodiment.

The embodiment of the present disclosure is described in a relatively concise manner. For related parts, reference may be made to the corresponding description of the foregoing embodiments.

The embodiment of the present disclosure provides an electronic device 700, comprising:

a memory 702 and a processor 704;

the memory 702 is configured to store computer-executable instructions to perform acts comprising, and the processor 704 is configured to execute the computer-executable instructions to perform acts comprising:

determining a database table for which a database index is to be created, wherein the database table comprises a spatial field for storing spatial data;

acquiring, for the database table, a spatial filter condition comprising a spatial field ID; and generating, according to the spatial filter condition, a tree-structured spatial index for the database table, wherein a leaf node of the tree-structured spatial index stores therein spatial data meeting the spatial filter condition and a primary key ID.

For example, the spatial filter condition includes spatial field prefix information; and the processor 704 is further configured to execute the following computer-executable instructions to perform acts comprising:

acquiring, according to the spatial filter condition, spatial field prefix information used for generating the tree-structured spatial index;

generating, according to the spatial field prefix information, a spatial prefix index for the database table, wherein an index column of the spatial prefix index comprises the spatial field prefix information; and using the spatial prefix index as the tree-structured spatial index.

For example, the spatial filter condition includes a filter condition of a minimum bounding rectangle operation type; and the processor 704 is further configured to execute the following computer-executable instructions to perform acts comprising:

performing, according to the filter condition of the minimum bounding rectangle operation type, minimum bounding box filtering on the database table to obtain an alternative spatial field meeting the filter condition of the minimum bounding rectangle operation type;

performing standard byte-stream encoding for geospatial information on spatial data stored in the alternative spatial field; and generating the spatial prefix index of the database table according to the spatial data on which the standard byte-stream encoding for geospatial information is performed and the spatial field prefix information.

For example, the spatial field prefix information includes a condition for indicating a length of the spatial data stored in the spatial field; and the processor 704 is further configured to execute the following computer-executable instructions to perform acts comprising:

acquiring a length of the spatial data on which the standard byte-stream encoding for geospatial information is performed;

acquiring the length condition according to the spatial field prefix information; and if the length of the spatial data on which the standard byte-stream encoding for geospatial information is performed meets the length condition, storing in a leaf node of the spatial prefix index the spatial data meeting the length condition;

otherwise, the leaf node of the spatial prefix index does not save the spatial data.

For example, the processor 704 is further configured to execute the following computer-executable instructions to perform acts comprising:

acquiring, according to the spatial filter condition, information of a spatial field used for generating the tree-structured spatial index;

acquiring information of a non-spatial field used for generating the tree-structured spatial index;

generating, according to the information of the spatial field and the information of the non-spatial field, a composite spatial index of the database table, wherein an index column of the spatial composite index comprises the spatial field and the non-spatial field; and using the composite spatial index as the tree-structured spatial index.

For example, the processor 704 is further configured to execute the following computer-executable instructions to perform acts comprising:

acquiring, according to the spatial filter condition, information of a spatial field prefix used for generating the tree-structured spatial index;

acquiring information of a non-spatial field used for generating the tree-structured spatial index;

generating, according to the information of the spatial field prefix and the information of the non-spatial field, a composite prefix spatial index, wherein an index column of the composite prefix spatial index comprises the spatial field prefix and the non-spatial field; and using the composite prefix spatial index as the tree-structured spatial index.

For example, an index column of the tree-structured spatial index comprises a spatial field; and a non-leaf node of the tree-structured spatial index stores therein a minimum bounding rectangle for retrieving the spatial data and a page ID for searching a next-level page.

For example, the processor 704 is further configured to execute the following computer-executable instructions to perform acts comprising:

creating, according to a database table creation command, the database table, wherein the database table creation command comprises an index creation command for generating the tree-structured spatial index; or creating, according to the index creation command, the tree-structured spatial index.

Figure 7:
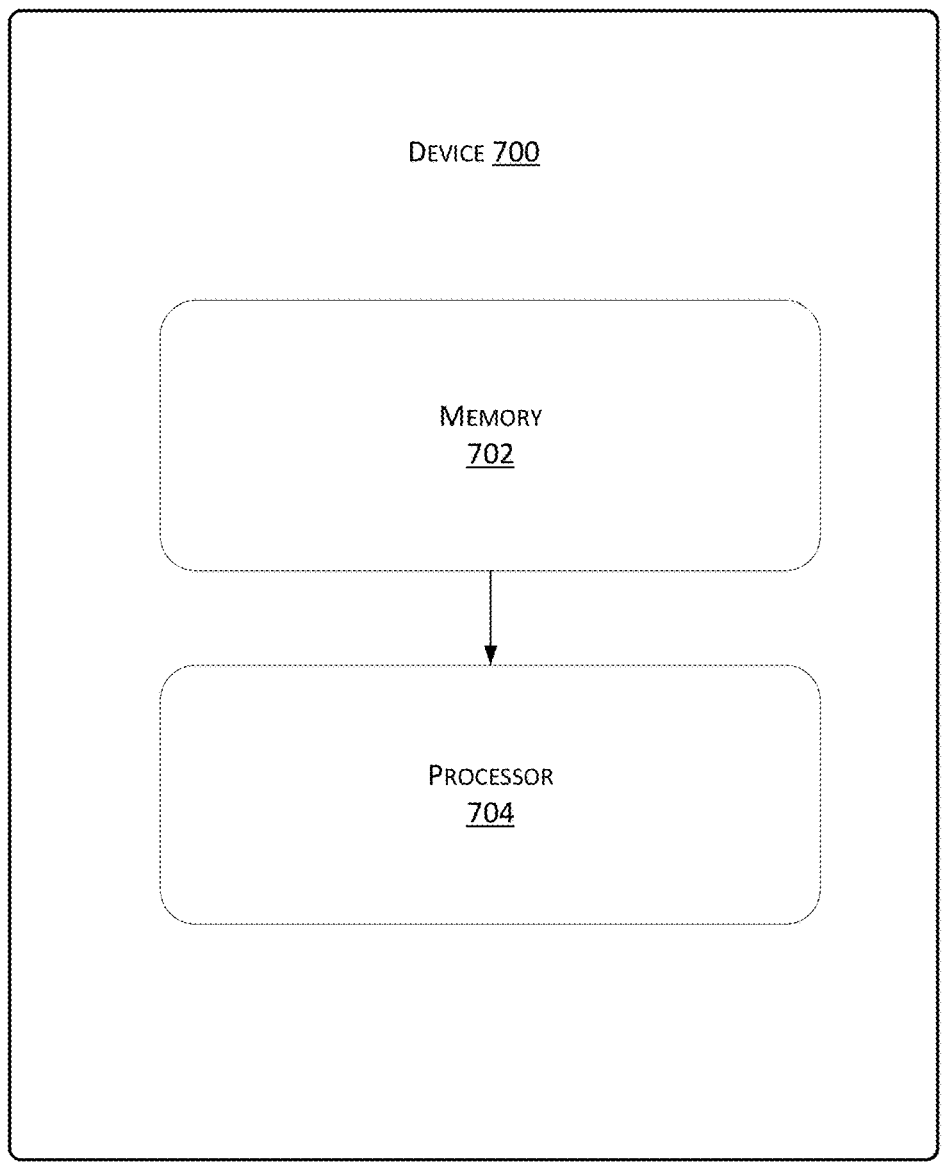
FIG. 7 is a schematic diagram of an electronic device according to an embodiment of the present disclosure.

Based on the foregoing embodiments, an embodiment of the present disclosure further provides an electronic device for implementing the database query processing method, the structure of which is similar to that shown in FIG. 7.

The embodiment of the present disclosure is described in a relatively concise manner. For related parts, reference may be made to the corresponding description of the foregoing embodiments.

The embodiment of the present disclosure provides an electronic device, comprising:

a memory and a processor;

the memory is configured to store computer-executable instructions, and the processor is configured to execute the computer-executable instructions:

the memory is configured to store computer-executable instructions, and the processor is configured to execute the computer-executable instructions:

determining a database table within which spatial data is to be queried, wherein the database table comprises a spatial field for storing spatial data;

acquiring, for the database table, a query condition comprising a spatial query field;

acquiring a tree-structured spatial index of the database table, wherein a leaf node of the tree-structured spatial index stores therein spatial data; and querying, according to the query condition, the tree-structured spatial index to obtain a query result.

For example, the leaf node further includes a primary key ID.

For example, the query condition further includes a non-spatial field; and the processor is further configured to execute the following computer-executable instructions:

acquiring a spatial field of the query condition;

determining whether the spatial field matches a spatial field ID of an index column of the tree-structured spatial index;

if so, querying, according to the spatial query field of the query condition, a composite spatial index of the database table to obtain a query result meeting the query condition; and if not, obtaining an alternative record of a non-spatial query field matching the query condition in the database table; and acquiring, according to the spatial query field of the query condition and from the alternative record, a query result meeting the query condition.

For example, the processor is further configured to execute the following computer-executable instructions:

acquiring a non-spatial query field of the query condition;

determining whether the spatial query field and the non-spatial query field are index columns comprised in the composite spatial index of the database table;

if so, determining that the query condition meets a spatial index query mode of the database table, and querying, according to the query condition, the composite spatial index of the database table using a covering index scan;

if not, querying to find, according to the query condition, an alternative record meeting the query condition from the composite spatial index of the database table, and according to a primary key of the alternative record, returning to the database table for further querying and obtaining a complete row record that meets the query condition.

For example, the processor is further configured to execute the following computer-executable instructions:

determining, according to the spatial query field, whether the spatial query field is a spatial field of the composite spatial index of the database table that is queried;

if so, querying the composite spatial index using the covering index scan according to a length condition included in prefix information of the spatial query field; and if not, querying the composite spatial index of the database table using the covering index scan.

For example, the processor is further configured to execute the following computer-executable instructions:

acquiring the length condition included in the prefix information of the spatial query field;

determining whether a length of a row record of the composite spatial index meets the length condition; and if so, using the row record as a query result of the covering index scan; and if not, querying the database table according to primary key information.

For example, the processor is further configured to execute the following computer-executable instructions:

performing spatial computation on data of the alternative row record, and according to a computation result, acquiring, from the alternative row record, a row record that accords with the spatial query field; and using the row record that meets the spatial query field as the query result meeting the query condition.

For example, spatial query information of the query condition is a minimum bounding rectangle operation comprising the spatial query field.

For example, an index column of the tree-structured spatial index comprises a spatial field; and a non-leaf node of the tree-structured spatial index stores therein a minimum bounding rectangle for retrieving the spatial data and a page ID for searching a next-level page.

An embodiment of the present disclosure further provides a storage device, which is described in a relatively simple manner. For related parts, reference may be made to the corresponding description of the foregoing embodiments.

The present disclosure provides a storage device having instructions stored therein, and the instructions can be loaded by a processor to execute the following steps:

determining a database table for which a database index is to be created, wherein the database table comprises a spatial field for storing spatial data;

acquiring, for the database table, a spatial filter condition comprising a spatial field ID; and generating, according to the spatial filter condition, a tree-structured spatial index for the database table, wherein a leaf node of the tree-structured spatial index stores therein spatial data meeting the spatial filter condition and a primary key ID.

an embodiment of the present disclosure further provides a storage device, which is described in a relatively simple manner. For related parts, reference may be made to the corresponding description of the foregoing embodiments.

The present disclosure provides a storage device having instructions stored therein, and the instructions can be loaded by a processor to execute the following steps:

the memory is configured to store computer-executable instructions, and the processor is configured to execute the computer-executable instructions to perform acts comprising:

determining a database table within which spatial data is to be queried, wherein the database table comprises a spatial field for storing spatial data;

acquiring, for the database table, a query condition comprising a spatial query field;

acquiring a tree-structured spatial index of the database table, wherein a leaf node of the tree-structured spatial index stores therein spatial data; and querying, according to the query condition, the tree-structured spatial index to obtain a query result.

In a typical configuration, a computing device includes one or more processors (CPU), an input/output interface, a network interface, and a memory.

The memory may include a volatile memory on a computer-readable medium, a random-access memory (RAM) and/or a non-volatile memory, and the like, such as a read-only memory (ROM) or a flash random access memory (flash RAM). The memory is an example of the computer-readable media.

1. Computer-readable media further include nonvolatile and volatile, removable and non-removable media employing any method or technique to achieve information storage. The information may be computer readable instructions, data structures, modules of programs, or other data. Examples of computer storage media include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices or any other non-transmission medium, which may be used to store information that can be accessed by a computing device. As defined herein, the computer-readable media do not include transitory media, such as modulated data signals and carriers 2. Those skilled in the art should understand that the embodiments of the present disclosure can be provided as a method, a system, or a computer program product. Therefore, the present disclosure may take a form of an entirely hardware embodiment, an entirely software embodiment, or an embodiment combining software and hardware elements. Furthermore, the present invention may take the form of a computer program product which is embodied on one or more computer-usable storage media (including, but not limited to, disk storage, CD-ROM, optical storage, and so forth) having computer-usable program code included therein.

Although the present disclosure is disclosed as above in example embodiments, the present disclosure is not to be limited thereby. Any person skilled in the art may make possible changes and modifications without departing from the spirit and scope of the present disclosure. Therefore, the protection scope of the present disclosure shall be defined by the claims of the present disclosure.

The present disclosure may further be understood with clauses as follows.

Clause 1. A database index processing method, the method comprising:

determining a database table for which a database index is to be created, the database table comprising a spatial field for storing spatial data;

acquiring, for the database table, a spatial filter condition comprising a spatial field ID; and generating, according to the spatial filter condition, a tree-structured spatial index for the database table, a leaf node of the tree-structured spatial index storing therein spatial data meeting the spatial filter condition and a primary key ID.

Clause 2. The method according to clause 1, wherein:

the spatial filter condition comprises spatial field prefix information; and the generating, according to the spatial filter condition, the tree-structured spatial index for the database table comprises:

acquiring, according to the spatial filter condition, spatial field prefix information used for generating the tree-structured spatial index;

generating, according to the spatial field prefix information, a spatial prefix index for the database table, an index column of the spatial prefix index comprising the spatial field prefix information; and using the spatial prefix index as the tree-structured spatial index.

Clause 3. The method according to clause 2, wherein:

the spatial filter condition comprises a filter condition of a minimum bounding rectangle operation type; and the generating, according to the spatial field prefix information, the spatial prefix index for the database table comprises:

performing, according to the filter condition of the minimum bounding rectangle operation type, a minimum bounding box filtering on the database table to obtain an alternative spatial field meeting the filter condition of the minimum bounding rectangle operation type;

performing a standard byte-stream encoding for geospatial information on spatial data stored in the alternative spatial field; and generating the spatial prefix index of the database table according to the spatial data on which the standard byte-stream encoding for geospatial information is performed and the spatial field prefix information.

Clause 4. The method according to clause 3, wherein:
the spatial field prefix information comprises a condition for indicating a length of spatial data stored in the spatial field; and
the generating the spatial prefix index of the database table according to the spatial data on which the standard byte-stream encoding for geospatial information is performed and the spatial field prefix information comprises:
acquiring a length of the spatial data on which the standard byte-stream encoding for geospatial information is performed;
acquiring a length condition according to the spatial field prefix information; and
in response to determining that the length of the spatial data on which the standard byte-stream encoding for geospatial information is performed meets the length condition, storing in a leaf node of the spatial prefix index the spatial data meeting the length condition; or
in response to determining that the length of the spatial data on which the standard byte-stream encoding for geospatial information is not performed meets the length condition, determining not to store in the leaf node of the spatial prefix index the spatial data.

Clause 5. The method according to clause 1, wherein the generating, according to the spatial filter condition, the tree-structured spatial index for the database table comprises:
acquiring, according to the spatial filter condition, information of a spatial field used for generating the tree-structured spatial index;
acquiring information of a non-spatial field used for generating the tree-structured spatial index;
generating, according to the information of the spatial field and the information of the non-spatial field, a composite spatial index of the database table, an index column of the spatial composite index comprising the spatial field and the non-spatial field; and
using the composite spatial index as the tree-structured spatial index.

Clause 6. The method according to clause 1, wherein the generating, according to the spatial filter condition, the tree-structured spatial index for the database table comprises:
acquiring, according to the spatial filter condition, information of a spatial field prefix used for generating the tree-structured spatial index;
acquiring information of a non-spatial field used for generating the tree-structured spatial index;
generating, according to the information of the spatial field prefix and the information of the non-spatial field, a composite prefix spatial index, an index column of the composite prefix spatial index comprising the spatial field prefix and the non-spatial field; and
using the spatial composite prefix index as the tree-structured spatial index.

Clause 7. The method according to clause 1, wherein:
an index column of the tree-structured spatial index comprises a spatial field; and
a non-leaf node of the tree-structured spatial index stores therein a minimum bounding rectangle for retrieving the spatial data and a page ID for searching a next-level page.

Clause 8. The method according to clause 1, further comprising:
creating, according to a database table creation command, the database table, the database table creation command comprising an index creation command for generating the tree-structured spatial index; or
creating, according to the index creation command, the tree-structured spatial index.

Clause 9. A database query processing method, the method comprising:
determining a database table within which spatial data is to be queried, the database table comprising a spatial field for storing spatial data;
acquiring, for the database table, a query condition comprising a spatial query field;
acquiring a tree-structured spatial index of the database table, a leaf node of the tree-structured spatial index storing therein spatial data; and
querying, according to the query condition, the tree-structured spatial index to obtain a query result.

Clause 10. The method according to clause 9, wherein:
the query condition further comprises a non-spatial field; and
the querying, according to the query condition, the tree-structured spatial index to obtain the query result comprises:
acquiring a spatial field of the query condition;
determining whether the spatial field matches a spatial field ID of an index column of the tree-structured spatial index; and
in response to determining that the spatial field matches a spatial field ID of an index column of the tree-structured spatial index, querying, according to the spatial query field of the query condition, a composite spatial index of the database table to obtain a query result meeting the query condition; or
in response to determining that the spatial field does not match a spatial field ID of an index column of the tree-structured spatial index, obtaining an alternative record of a non-spatial query field matching the query condition in the database table, and acquiring, according to the spatial query field of the query condition and from the alternative record, a query result meeting the query condition.

Clause 11. The method according to clause 10, wherein the querying, according to the spatial query field of the query condition, the composite spatial index of the database table to obtain the query result meeting the query condition comprises:
acquiring a non-spatial query field of the query condition;
determining whether the spatial query field and the non-spatial query field are at in index column comprised in the composite spatial index of the database table; and
in response to determining that the spatial query field and the non-spatial query field are at in index column comprised in the composite spatial index of the database table, determining that the query condition meets a spatial index query mode of the database table, and querying, according to the query condition, the composite spatial index of the database table using a covering index scan; or
in response to determining that the spatial query field and the non-spatial query field are not at in index column comprised in the composite spatial index of the database table, querying to find, according to the query condition, an alternative record meeting the query condition from the composite spatial index of the database table, and according to a primary key of the alternative record, returning to the database table for further querying and obtaining a complete row record that meets the query condition.

Clause 12. The method according to clause 11, wherein the querying, according to the query condition, the composite spatial index of the database table using the covering index scan comprises:

determining, according to the spatial query field, whether the spatial query field is a spatial field of the composite spatial index of the database table that is queried; and in response to determining, according to the spatial query field, that the spatial query field is a spatial field of the composite spatial index of the database table that is queried, querying the composite spatial index using the covering index scan according to a length condition included in prefix information of the spatial query field; or in response to determining, according to the spatial query field, that the spatial query field is not a spatial field of the composite spatial index of the database table that is queried, querying the composite spatial index of the database table using the covering index scan.

Clause 13. The method according to clause 12, wherein the querying the composite spatial index using the covering index scan according to the length condition included in prefix information of the spatial query field comprises:

acquiring the length condition included in the prefix information of the spatial query field;

determining whether a length of a row record of the composite spatial index meets the length condition; and in response to determining that the length of the row record of the composite spatial index meets the length condition, using the row record as a query result of the covering index scan; and in response to determining that the length of the row record of the composite spatial index does not meet the length condition, querying the database table according to primary key information.

Clause 14. The method according to clause 10, wherein the acquiring, according to the spatial query field of the query condition and from the alternative record, the query result meeting the query condition comprises:

performing a spatial computation on data of the alternative row record, and, according to a computation result, acquiring, from the alternative row record, a row record that accords with the spatial query field; and using the row record that accords with the spatial query field as the query result meeting the query condition.

Clause 15. The method according to clause 9, wherein spatial query information of the query condition is a minimum bounding rectangle operation comprising the spatial query field.

Clause 16. The method according to clause 9, wherein:

an index column of the tree-structured spatial index comprises the spatial field; and a non-leaf node of the tree-structured spatial index stores therein a minimum bounding rectangle for retrieving the spatial data and a page ID for searching a next-level page.

Clause 17. A database index processing apparatus, the apparatus comprising:

a database table determination unit, configured to determine a database table for which a database index is to be created, the database table comprising a spatial field for storing spatial data;

a filter condition acquisition unit, configured to acquire, for the database table, a spatial filter condition comprising a spatial field ID; and an index generation unit, configured to generate, according to the spatial filter condition, a tree-structured spatial index for the database table, a leaf node of the tree-structured spatial index storing therein spatial data meeting the spatial filter condition and a primary key ID.

Clause 18. A database query processing apparatus, the apparatus comprising:

a database table determination unit, configured to determine a database table within which spatial data is to be queried, the database table comprising a spatial field for storing spatial data;

a query condition determination unit, configured to acquire, for the database table, a query condition comprising a spatial query field;

an index acquisition unit, configured to acquire a tree-structured spatial index of the database table, a leaf node of the tree-structured spatial index storing therein the spatial data; and a query unit, configured to query, according to the query condition, the tree-structured spatial index to obtain a query result.

Clause 19. An electronic device comprising:

a memory and a processor; and the memory is configured to store computer-executable instructions, and the processor is configured to execute the computer-executable instructions to perform acts comprising:

determining a database table for which a database index is to be created, the database table comprising a spatial field for storing spatial data;

acquiring, for the database table, a spatial filter condition comprising a spatial field ID; and generating, according to the spatial filter condition, a tree-structured spatial index for the database table, wherein a leaf node of the tree-structured spatial index stores therein spatial data meeting the spatial filter condition and a primary key ID.

Clause 20. An electronic device comprising:

a memory and a processor; and the memory is configured to store computer-executable instructions, and the processor is configured to execute the computer-executable instructions to perform acts comprising:

determining a database table within which spatial data is to be queried, the database table comprising a spatial field for storing spatial data;

acquiring, for the database table, a query condition comprising a spatial query field;

acquiring a tree-structured spatial index of the database table, wherein a leaf node of the tree-structured spatial index stores therein spatial data; and querying, according to the query condition, the tree-structured spatial index to obtain a query result.

Clause 21. A storage device having instructions stored therein, and the instructions are executable by a processor to cause the processor to perform acts comprising:

determining a database table for which a database index is to be created, the database table comprising a spatial field for storing spatial data;

acquiring, for the database table, a spatial filter condition comprising a spatial field ID; and generating, according to the spatial filter condition, a tree-structured spatial index for the database table, a leaf node of the tree-structured spatial index storing therein spatial data meeting the spatial filter condition and a primary key ID.

Clause 22. A storage device having instructions stored therein, and the instructions are executable by a processor to cause the processor to perform acts comprising:

determining a database table within which spatial data is to be queried, the database table comprising a spatial field for storing spatial data;

acquiring, for the database table, a query condition comprising a spatial query field;

acquiring a tree-structured spatial index of the database table, a leaf node of the tree-structured spatial index storing therein spatial data; and querying, according to the query condition, the tree-structured spatial index to obtain a query result.

What is claimed is:

1. A method comprising:
   determining a database table within which spatial data is to be queried, the database table comprising a spatial field for storing spatial data and a non-spatial field;
   acquiring, for the database table, a query condition comprising a spatial query field;
   acquiring a tree-structured spatial index of the database table, a leaf node of the tree-structured spatial index storing therein spatial data; and
   querying, according to the query condition, the tree-structured spatial index to obtain a query result, the querying the tree-structured spatial index to obtain the query result including:
   acquiring a spatial field of the query condition;
   determining whether the spatial field matches a spatial field ID of an index column of the tree-structured spatial index; and
   in response to determining that the spatial field matches a spatial field ID of an index column of the tree-structured spatial index, querying, according to the spatial query field of the query condition, a composite spatial index of the database table to obtain a query result meeting the query condition; or
   in response to determining that the spatial field does not match a spatial field ID of an index column of the tree-structured spatial index, obtaining an alternative record of a non-spatial query field matching the query condition in the database table, and acquiring, according to the spatial query field of the query condition and from the alternative record, a query result meeting the query condition.

2. The method according to claim 1, wherein the querying, according to the spatial query field of the query condition, the composite spatial index of the database table to obtain the query result meeting the query condition comprises:
   acquiring a non-spatial query field of the query condition;
   determining that the spatial query field and the non-spatial query field are at an index column comprised in the composite spatial index of the database table;
   determining that the query condition meets a spatial index query mode of the database table; and
   querying, according to the query condition, the composite spatial index of the database table using a covering index scan.

3. The method according to claim 2, wherein the querying, according to the query condition, the composite spatial index of the database table using the covering index scan comprises:
   determining, according to the spatial query field, that the spatial query field is a spatial field of the composite spatial index of the database table that is queried; and
   querying the composite spatial index using the covering index scan according to a length condition included in prefix information of the spatial query field.

4. The method according to claim 3, wherein the querying the composite spatial index using the covering index scan according to the length condition included in the prefix information of the spatial query field comprises:
   acquiring the length condition included in the prefix information of the spatial query field;
   determining whether a length of a row record of the composite spatial index meets the length condition; and
   in response to determining that the length of the row record of the composite spatial index meets the length condition, using the row record as a query result of the covering index scan; or
   in response to determining that the length of the row record of the composite spatial index does not meet the length condition, querying the database table according to primary key information.

5. The method according to claim 1, wherein the querying, according to the spatial query field of the query condition, the composite spatial index of the database table to obtain the query result meeting the query condition comprises:
   acquiring a non-spatial query field of the query condition;
   determining that the spatial query field and the non-spatial query field are not at an index column comprised in the composite spatial index of the database table; and
   querying to find, according to the query condition, an alternative record meeting the query condition from the composite spatial index of the database table, and according to a primary key of the alternative record, returning to the database table for further querying and obtaining a complete row record that meets the query condition.

6. The method according to claim 2, wherein the querying, according to the query condition, the composite spatial index of the database table using the covering index scan comprises:
   determining, according to the spatial query field, that the spatial query field is not a spatial field of the composite spatial index of the database table that is queried; and
   querying the composite spatial index of the database table using the covering index scan.

7. The method according to claim 1, wherein the acquiring, according to the spatial query field of the query condition and from the alternative record, the query result meeting the query condition comprises:
   performing a spatial computation on data of an alternative row record, and, according to a computation result, acquiring, from the alternative row record, a row record that accords with the spatial query field; and
   using the row record that accords with the spatial query field as the query result meeting the query condition.

8. The method according to claim 1, wherein spatial query information of the query condition is a minimum bounding rectangle operation comprising the spatial query field.

9. The method according to claim 1, wherein:
   an index column of the tree-structured spatial index comprises the spatial field.

10. The method according to claim 1, wherein:
    a non-leaf node of the tree-structured spatial index stores therein a minimum bounding rectangle for retrieving the spatial data and a page ID for searching a next-level page.

11. An apparatus comprising:
one or more processors; and
one or more computer-readable media storing thereon computer-readable instructions that, when executed by the one or more processors, cause the one or more processors to perform acts comprising:
  determining a database table within which spatial data is to be queried, the database table comprising a spatial field for storing spatial data and a non-spatial field;
  acquiring, for the database table, a query condition comprising a spatial query field;
  acquiring a tree-structured spatial index of the database table, a leaf node of the tree-structured spatial index storing therein spatial data; and
  querying, according to the query condition, the tree-structured spatial index to obtain a query result, the querying the tree-structured spatial index to obtain the query result including:
    acquiring a spatial field of the query condition;
    determining that the spatial field matches a spatial field ID of an index column of the tree-structured spatial index; and
    in response to determining that the spatial field matches a spatial field ID of an index column of the tree-structured spatial index, querying, according to the spatial query field of the query condition, a composite spatial index of the database table to obtain a query result meeting the query condition.

12. The apparatus according to claim 11, wherein the querying, according to the spatial query field of the query condition, the composite spatial index of the database table to obtain the query result meeting the query condition comprises:
  acquiring a non-spatial query field of the query condition;
  determining that the spatial query field and the non-spatial query field are at an index column comprised in the composite spatial index of the database table;
  determining that the query condition meets a spatial index query mode of the database table; and
  querying, according to the query condition, the composite spatial index of the database table using a covering index scan.

13. The apparatus according to claim 12, wherein the querying, according to the query condition, the composite spatial index of the database table using the covering index scan comprises:
  determining, according to the spatial query field, that the spatial query field is not a spatial field of the composite spatial index of the database table that is queried; and
  querying the composite spatial index of the database table using the covering index scan.

14. The apparatus according to claim 12, wherein the querying, according to the query condition, the composite spatial index of the database table using the covering index scan comprises:
  determining, according to the spatial query field, that the spatial query field is a spatial field of the composite spatial index of the database table that is queried; and
  querying the composite spatial index using the covering index scan according to a length condition included in prefix information of the spatial query field.

15. The apparatus according to claim 14, wherein the querying the composite spatial index using the covering index scan according to the length condition included in the prefix information of the spatial query field comprises:
  acquiring the length condition included in the prefix information of the spatial query field;
  determining that a length of a row record of the composite spatial index meets the length condition; and
  in response to determining that the length of the row record of the composite spatial index meets the length condition, using the row record as a query result of the covering index scan.

16. The apparatus according to claim 14, wherein the querying the composite spatial index using the covering index scan according to the length condition included in the prefix information of the spatial query field comprises:
  acquiring the length condition included in the prefix information of the spatial query field;
  determining that a length of a row record of the composite spatial index does not meet the length condition; and
  in response to determining that the length of the row record of the composite spatial index does not meet the length condition, querying the database table according to primary key information.

17. The apparatus according to claim 11, wherein the querying, according to the spatial query field of the query condition, the composite spatial index of the database table to obtain the query result meeting the query condition comprises:
  acquiring a non-spatial query field of the query condition;
  determining that the spatial query field and the non-spatial query field are not at an index column comprised in the composite spatial index of the database table; and
  querying to find, according to the query condition, an alternative record meeting the query condition from the composite spatial index of the database table, and according to a primary key of the alternative record, returning to the database table for further querying and obtaining a complete row record that meets the query condition.

18. One or more computer-readable media storing thereon computer-readable instructions that, when executed by one or more processors, cause the one or more processors to perform acts comprising:
  determining a database table within which spatial data is to be queried, the database table comprising a spatial field for storing spatial data and a non-spatial field;
  acquiring, for the database table, a query condition comprising a spatial query field;
  acquiring a tree-structured spatial index of the database table, a leaf node of the tree-structured spatial index storing therein spatial data; and
  querying, according to the query condition, the tree-structured spatial index to obtain a query result, the querying the tree-structured spatial index to obtain the query result including:
    acquiring a spatial field of the query condition;
    determining that the spatial field does not match a spatial field ID of an index column of the tree-structured spatial index; and
    in response to determining that the spatial field does not match a spatial field ID of an index column of the tree-structured spatial index, obtaining an alternative record of a non-spatial query field matching the query condition in the database table, and acquiring, according to the spatial query field of the query condition and from the alternative record, a query result meeting the query condition.

19. The one or more computer-readable media according to claim 18, wherein the acquiring, according to the spatial query field of the query condition and from the alternative record, the query result meeting the query condition comprises:

performing a spatial computation on data of an alternative row record, and, according to a computation result, acquiring, from the alternative row record, a row record that accords with the spatial query field; and using the row record that accords with the spatial query field as the query result meeting the query condition.

20. The one or more computer-readable media according to claim 18, wherein a non-leaf node of the tree-structured spatial index stores therein a minimum bounding rectangle for retrieving the spatial data and a page ID for searching a next-level page.

\* \* \* \* \*